United States Patent [19]

Austin

[11] 3,836,028

[45] Sept. 17, 1974

[54] FEED APPARATUS

[75] Inventor: Richard A. Austin, West Springfield, Mass.

[73] Assignee: Valley Bank and Trust Company, Springfield, Mass.

[22] Filed: July 31, 1972

[21] Appl. No.: 276,582

[52] U.S. Cl. ............................. 214/338, 214/340
[51] Int. Cl. ..................................... B65h 51/06
[58] Field of Search ..................... 214/338; 1/1 PB

[56] References Cited
UNITED STATES PATENTS

| | | | |
|---|---|---|---|
| 2,034,451 | 3/1936 | Tripp | 214/340 |
| 2,751,781 | 6/1956 | McConnell | 214/1 PB |
| 3,074,605 | 1/1963 | Shaw | 214/339 |
| 3,091,900 | 6/1963 | Whittenberg | 214/338 |
| 3,258,144 | 6/1966 | Reschke | 214/340 |
| 3,447,074 | 5/1969 | Sower et al. | 214/338 |
| 3,517,844 | 6/1970 | Wloszek | 214/338 |

*Primary Examiner*—Robert J. Spar
*Assistant Examiner*—Kenneth Noland
*Attorney, Agent, or Firm*—Ross, Ross & Flavin

[57] ABSTRACT

Apparatus for feeding bar or tube stock to such as a lathe or screw machine or the like for machining operations comprising, a plurality of feed stations, each feed station performing the functions of: maintaining constant definition of a center line common to all feed stations and to the machine into which the stock is being fed; imparting rotary motion to the stock by means of a driven roll; imparting translatory motion to the stock by skewing the driven roll and/or an idler roll; and loading consecutive bars of stock into a feed position.

7 Claims, 6 Drawing Figures

FEED APPARATUS

A primary object of the invention is to provide feed apparatus for handling bar or tube stock of various lengths for feeding the stock to such as a lathe or screw machine or the like for any desired machine operations.

Heretofore, great difficulty has been encountered in feeding such stock for the reason that slight bends in the stock have set up serious whipping movements as the stock is fed to gravely endanger machine operators and machines alike.

In the apparatus hereof, a trio of feed rollers engages the periphery of the stock to maintain a constant center line regardless of bends in the stock.

By skewing certain of these rollers the stock is fed horizontally for desired machining operations.

Means is also provided for loading consecutive bars of stock into a feed position without machine stoppage or complicated adjustments.

These and other features will become apparent from a consideration of the attached drawings, in which.

Figure 1:
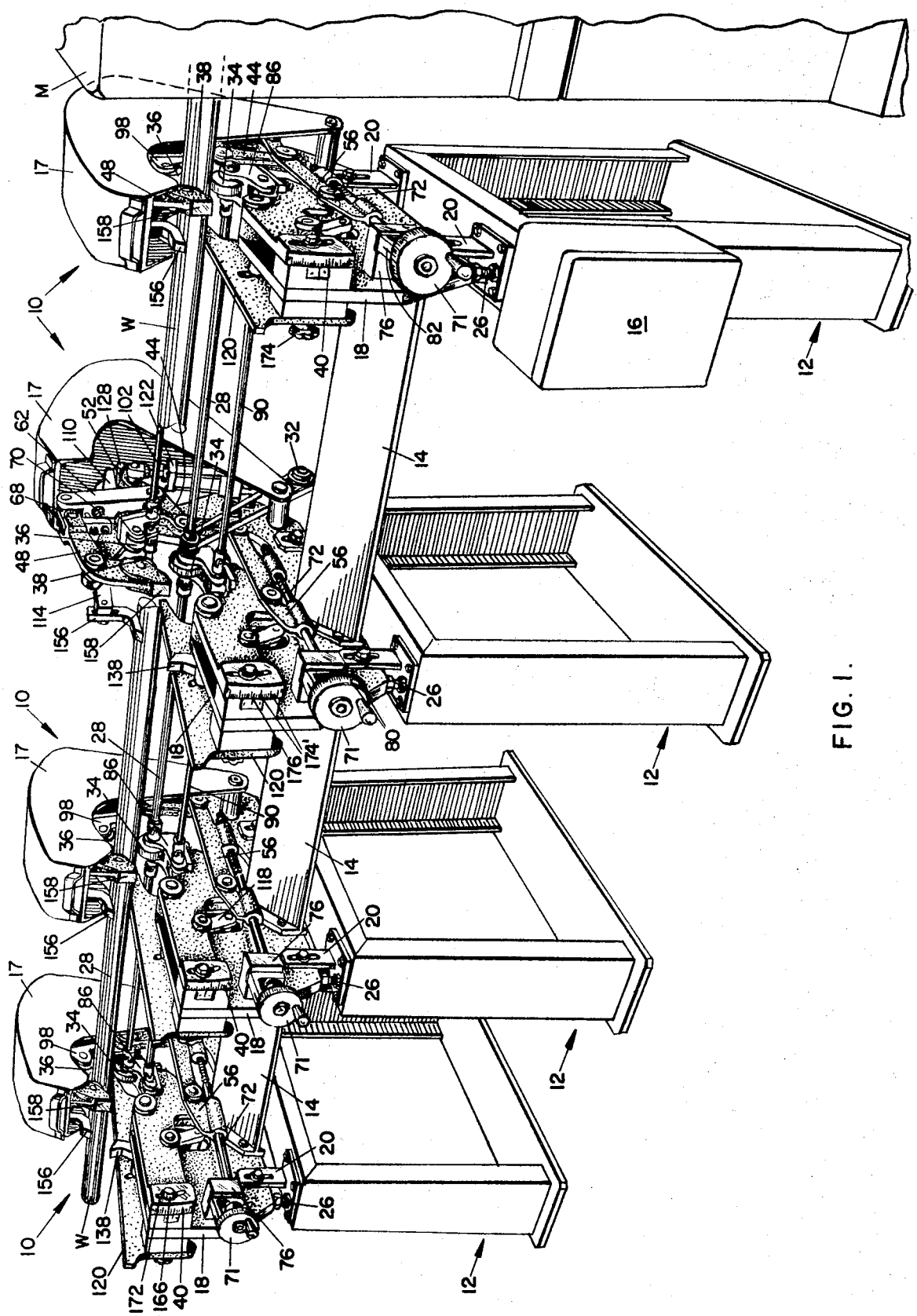
FIG. 1 is a perspective view of feed apparatus embodying a preferred form of the invention.

The feed apparatus of the invention consists of a plurality of coupled feed stations 10. The number of feed stations required is determined by the length of material to be handled. The basic design of the individual feed stations is such that each may perform four independent functions, namely:

1. maintaining constant definition of a center line common to all feed stations and to the machine into which the material is being fed;
2. imparting rotary motion to the material by means of a driven roll;
3. imparting translatory motion to the material by skewing the driven roll and/or an idler roll; and
4. loading consecutive bars of material into a feed position.

The feed stations 10 are substantially identical, wherefore only one will be described herefollowing.

Each feed station includes a support or stand 12 for supporting the unit in a raised position wherein bar or tube stock W may be fed to a machine M for any desired machining operations.

Braces 14 may extend between each feed station to impart strength and rigidity to the structure.

A control box or panel 16 for controlling the operation of the several stations is mounted on one of the supports or stands 12.

Protective hoods or covers 17 may be provided at each feed station for safety purposes.

An upright stanchion plate 18 is adjustably mounted relative to spaced brackets 20 fixed to the opposite ends of the upper surfaces of each support or stand 12, the brackets being slotted as at 22 to receive bolts 24 which pass therethrough and into the stanchion plate whereby, upon loosening of the bolts, the stanchion plate may be vertically adjusted as by manipulation of jack screws 26 or the like.

Driven, horizontally-aligned, coupled shafting 28 extends between each feed station, the shafting being rotatably driven as by a belt and pulley or chain drive 32 located at one of the stations, for purposes to appear.

A trio of rollers comprising a driven roller 34, an idler roller 36 and a guide roller 38 is provided at each feed station for engaging the bar or tube stock W.

The rollers are so related to the stanchion plates and to each other as to be self-centering by a linkage system now to be described.

A constant center line definition is accomplished by the aforementioned linkage system consisting of a primary link 40 pivoted to the stanchion plate at 42 and carrying driven roller 34, a secondary link 44 pivoted to the stanchion plate at 46 and carrying idler roller 36, and a tertiary link 48 carrying guide roller 38 and pivoted at 50 to one end of a loader arm 52 which is pivoted at its approximate midsection at 54 to the stanchion plate.

A first connector link 56 extends between and interconnects primary and secondary links 40 and 44 respectively, being pivoted to the lower end of primary link 40 at 58 and being pivoted to the lower end of secondary link 44 at 60.

A second connector link 62 is pivoted at its lower end at 64 to secondary link 44 and at its opposite upper end at 66 to one end of a compression link 68 which is pivoted at its opposite end at 69 to tertiary link 48.

Compression link 68 is spring-loaded by a spring assembly 70 to provide compensation for diametral variations and/or moderate bends in the bar or tube stock.

Simultaneous movement of primary link 40, secondary link 44 and tertiary link 48 is effected by rotation of a handwheel 71 having a screw 72 fixed thereto and extending horizontally rearwardly therefrom, the outer free end of the screw being journalled in a boss 74 depending from first connector link 56. Screw 72 additionally passes through a guide block 76 extending outwardly from stanchion plate 18 and through a guide boss 78 depending from first connector link 56 forwardly of boss 74.

Graduations 80 on the handwheel may be brought into registration with a sight mark 82 on guide block 76 for accuracy in adjustment.

Because of their geometric location and configuration, a common center line for an infinite number of diameters is defined by the tangent points of the rollers 34, 36 and 38 mounted on primary link 40, secondary link 44 and tertiary link 48 respectively.

Figure 4:
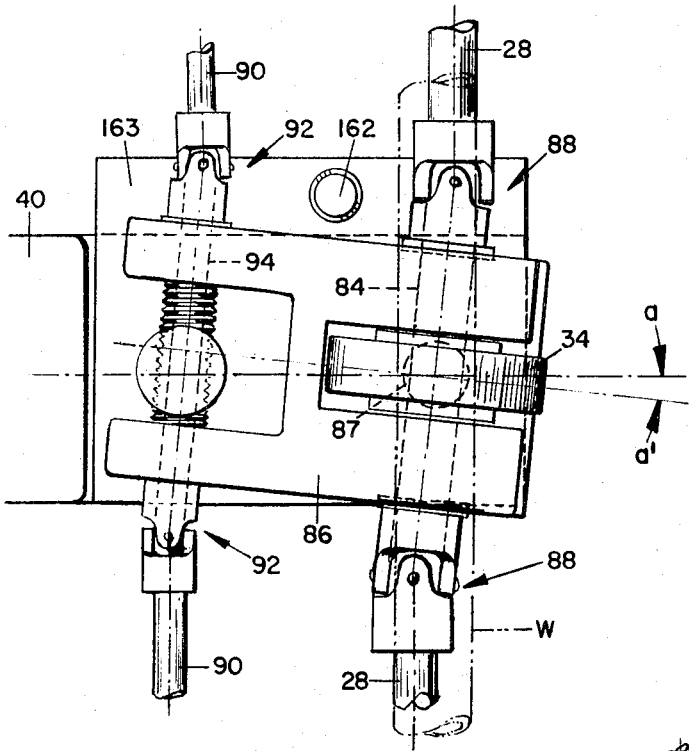
FIG. 4 is an enlarged, fragmentary, top plan view of the driven feed roller assembly of the feed station of FIGS. 2 and 3.

As best seen in FIG. 4, driven rollers 34 of each feed station are fixed to a shaft 84 which is journalled in a roller mount 86 mounted on pivot means 87 for pivotal movement about a substantially vertical axis relative to primary link 40. Universal joints 88 on each end of shaft 84 are connected to the adjacent ends of shafting 28 to connect all feed stations.

Push rods 90 extend between each feed station and are coupled by universal joints 92 to a shaft 94 which passes through the forward ends of roller mounts 86 at each feed station.

Figure 5:
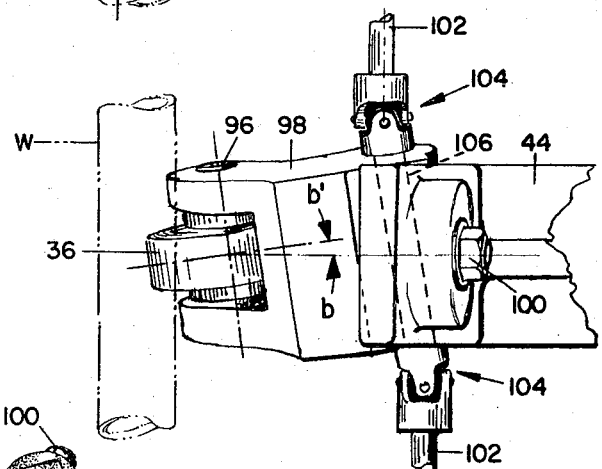
FIG. 5 is an enlarged, fragmentary, top plan view of the idler feed roller assembly of the feed station of FIGS. 2 and 3.
Figure 6:
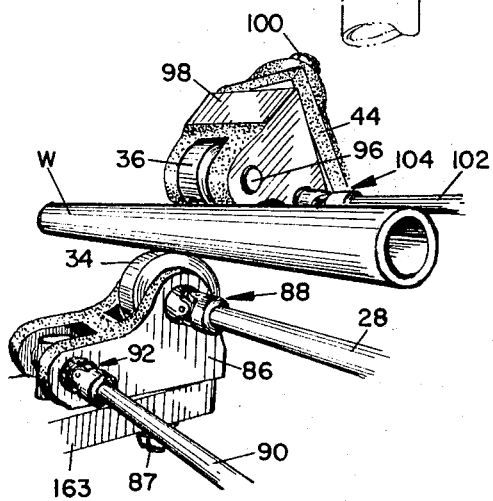
FIG. 6 is a fragmentary perspective view showing the relationship of the feed roller assemblies of FIGS. 4 and 5 relative to each other and to a work piece.

As best seen in FIG. 5, idler rollers 36 of each feed station are fixed to a shaft 96 which is journalled in a roller mount 98 mounted on pivot means 100 for pivotal movement about a substantially horizontal axis relative to secondary link 44.

Push rods 102 extend between each feed station and are coupled by universal joints 104 to a shaft 106 which passes through the lower ends of roller mounts 98 at each feed station.

Figure 2:
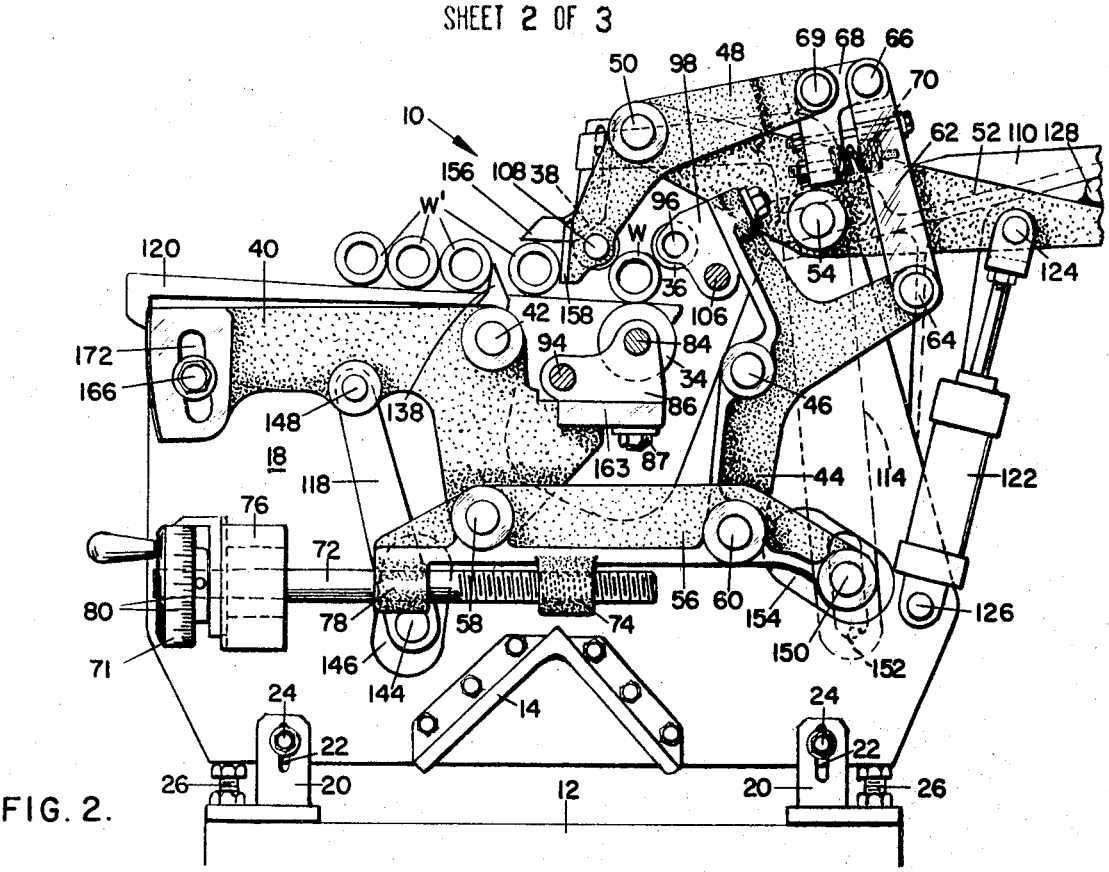
FIG. 2 is a side elevational view of a feed station of the type employed with the apparatus of FIG. 1, with parts omitted for clarity.
Figure 3:
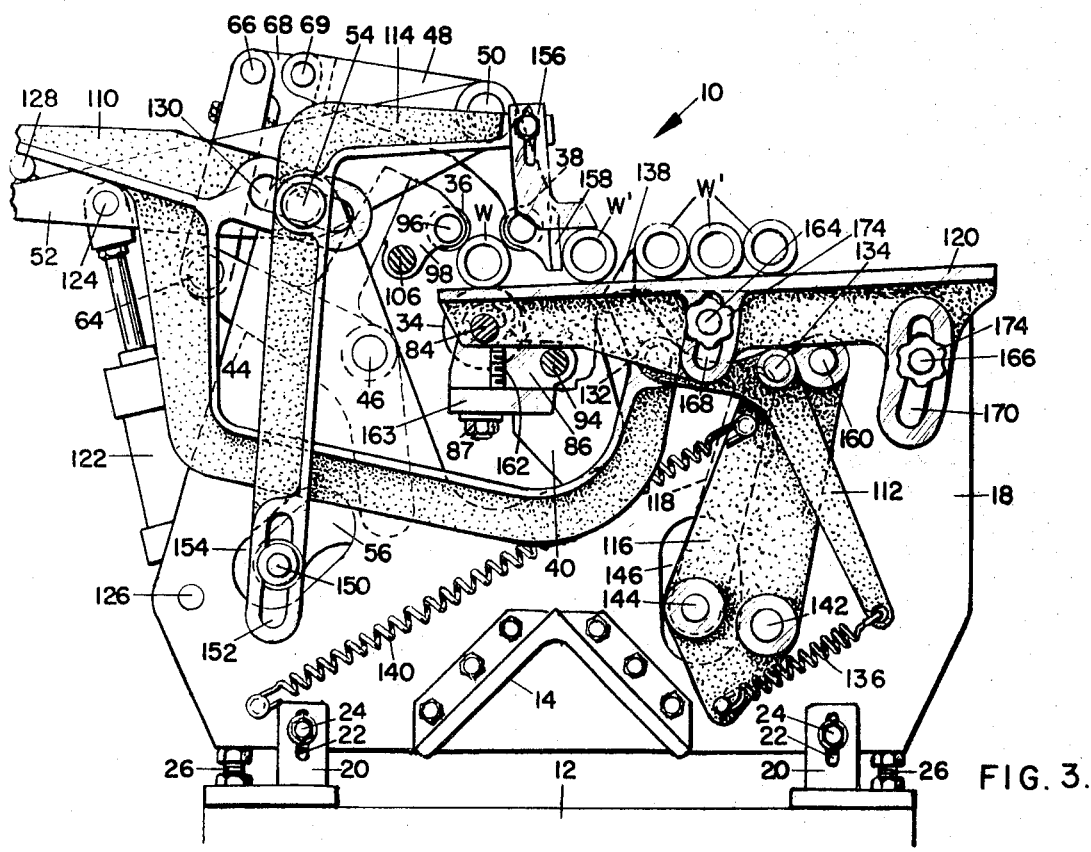
FIG. 3 is an elevational view as seen from the opposite side of the apparatus of FIG. 2.

As best seen in FIGS. 2 and 3, guide rollers 38 of each feed station are each fixed to a shaft 108 which is journalled in the lower free end of tertiary link 48.

Driven roller 34 mounted on primary link 40 is coupled to all rollers in this position on any number of feed stations by the universally jointed shafting 28. This arrangement provides a common drive shaft for all feed stations. This drive shaft, powered by belt and pulley drive 32, is attached to a power source, not shown, but typically located near the head of the feed apparatus.

The swivel roller mounts 86 on primary links 40 are coupled to all other roller mounts 86 in this position at any number of feed stations by push rods 90.

The swivel roller mounts 98 on secondary links 44 are coupled to all other roller mounts 98 in this position at any number of feed stations by push rods 102.

Simultaneous horizontal pushing or pulling movement of push rods 90 and 102 causes roller mounts 86 and 98 to swivel, thereby skewing rollers 34 and 36 on an angle in relationship to a plane 90° to the common center line of the link system consisting of links 40, 44 and 48.

Since this skewing occurs during rotary motion imparted to the material W from the driven roller 34 on primary link 40 translation of the material is effected in a horizontal direction along the common center line previously defined toward machine M.

The skewing of the rollers 34 is dramatised in FIG. 4 by the phantom center lines $a-a'$; the skewing of the rollers 36 is dramatised in FIG. 5 by the phantom center lines $b-b'$.

A loader mechanism attached to a number of feed stations as required provides automatic or semi-automatic handling of multiple bars or tubes of stock W', see FIGS. 2 and 3.

The loader mechanism consists of loader arm 52, an interceptor member 110, an interceptor assist member 112, a hold-down member 114, a pair of coupling link members 116 and 118, a ramp 120, and a power cylinder 122.

As previously noted, loader arm 52 is pivoted to stanchion plate 18 at 54, with tertiary link 48 being pivoted thereto at one end thereof at 50.

Power cylinder 122 is pivotally attached at its upper end at 124 to the opposite end of loader arm 52 and at its lower end at 126 to stanchion plate 18.

A rearward extremity of interceptor member 110 rides on a cross member 128 provided on the upper surface of loader arm 52 adjacent the power cylinder pivot 124.

Interceptor member 110 is slotted at 130 adjacent one end thereof forwardly of cross member 128, with the pivot pin 54 passing through said slot. The opposite or forward end of interceptor member 110 is pivoted to interceptor assist member 112 at 132.

The interceptor assist member is pivoted to coupling link member 116 at 134 and is spring-loaded by a spring 136 which extends between the lower end thereof and the lower end of coupling link member 116.

Interceptor member 110 carries an interceptor point 138 at its forward end immediately above pivot 132 against which one of the bars or tubes of stock W' may abut.

Coupling link member 116 is spring-loaded by a spring 140 which extends therebetween and stanchion plate 18, the lower end of the coupling link member being pivoted to the stanchion plate at 142.

The lower end of coupling link member 116 is additionally connected to the lower end of coupling link member 118 by a pivot pin 144 which extends transversely through a provided slot 146 in stanchion plate 18.

Coupling link member 118 is pivoted at its upper end at 148 to primary link 40.

Hold down member 114 is pivoted adjacent its upper end to stanchion plate 18 at the pivot 54 and is pivoted at its lower end to the rearward end of first connector link 56 by a pivot pin 150 which extends through a slot 152 in the hold down member and a slot 154 in the stanchion plate.

The upper forward end of hold-down member 114 has a foot 156 adjustably secured thereto, the foot being adapted to rest on the innermost tube or bar of stock W' which additionally bears against an abutment 158 provided on the forward end of tertiary link 48 immediately forwardly of guide roller 38.

As best seen in FIG. 3, ramp 120 is not attached to any link, but rides at one end on a dowel 160 which extends outwardly from the upper end of coupling link member 116, and rides at its opposite end on the point of a screw 162 extending vertically-upwardly from a pallet 163 fixed to and extending outwardly from primary link 40 and which carries driven roller mount 86 and pivot means 87.

The ramp is adjustably mounted relative to stanchion 18 and primary link 40 by means of a pair of lock bolts 164 and 166 which extend through slots 168 and 170 respectively provided on the ramp, with lock bolt 166 additionally extending through a slot 172 provided adjacent the forward end of primary link 40.

Finger nuts 174 on the lock bolts facilitate ramp adjustment.

As seen in FIG. 1, graduations 174' are provided on the forward end of primary link 40 for registration with a sight mark 176 on the forward end of stanchion plate 18 for accuracy of ramp adjustment.

Movement of first connector link 56 by handwheel 71 and screw 72 causes hold-down arm 114 and the interceptor point 138 of interceptor arm 110 to track into correct position corresponding to the diameter simultaneously being defined by the tangent points of the rollers 34, 36 and 38 on links 40, 44 and 48 respectively. Ramp 120 also tracks on dowel 160 in coupling link member 116 and the screw point 162 on the pallet of primary link 40, thereby maintaining tangency to driven roll 34 and changing its slope inversely to the diameter defined by the rollers 34, 36 and 38 on links 40, 44 and 48 respectively.

A typical load cycle functions as follows. The cylinder 122 is energized. Loader arm 52 pivots, simultaneously raising tertiary link 48 and allowing interceptor assist member 112 to raise the interceptor point 138 of interceptor member 110. The interceptor point 138 holds back all material W' on ramp 120 with the exception of the first bar or tube which is resting against abutment 158 on the end of tertiary link 48. Loader arm 52 continues to raise tertiary link 48, ultimately releasing the first bar or tube, allowing it to roll into feed position. Cylinder travel is then reversed and tertiary link 48 clamps the new bar or tube in position. Loader arm 52 pivots, whereupon the cross member 128 thereon moves interceptor member 110, retracting interceptor point 138, thereby releasing the remaining material W' on ramp 120. This then positions the next bar or tube into the load position.

I claim:

1. Apparatus of modular construction for feeding bar or tube stock of various diameters to a machine comprising, a plurality of feed stations each including a plurality of rollers in contact with the stock, means interlinking the rollers of each feed station for simultaneous movement of all rollers for maintaining a constant definition of a predetermined center line common to all feed stations and to the machine as stock is being fed regardless of stock diameter, means for driving one of the rollers of at least one feed station for imparting a rotary motion to the stock, means for skewing at least one of the rollers of each feed station for imparting a translatory motion to the stock, and means for loading consecutive bars of stock into a feed position.

2. Apparatus according to claim 1, wherein each feed station includes a trio of rollers disposed at spaced intervals around the stock and in tangency thereto.

3. Apparatus according to claim 1, wherein the means for driving the rollers of each feed station and said means for skewing the rollers comprise universally coupled shafting, the universally coupled shafting connecting the driven rollers providing a common drive shaft for all such rollers.

4. Apparatus according to claim 1, wherein the means for loading consecutive bars of stock into a feed position comprises a power driven system of links carrying the rollers and a ramp for supporting the bars of stock, one of the links having an interceptor point for holding back all of the bars of stock with the exception of the first bar which rests against an abutment on another of the links, the last named link being movable for releasing said first bar for allowing it to roll into a feed position between the rollers.

5. Apparatus according to claim 1, including means for adjusting the spacing between the rollers for accommodating various stock sizes.

6. Apparatus according to claim 4, including means for mechanically interconnecting the rollers, the ramp and the interceptor point, and means for effecting simultaneous adjustment of the rollers, the ramp and the interceptor point.

7. Apparatus according to claim 6, wherein the means for effecting simultaneous adjustment of the rollers, the ramp and the interceptor point comprises a handwheel.

* * * * *